United States Patent
Knox

(10) Patent No.: US 8,807,982 B2
(45) Date of Patent: Aug. 19, 2014

(54) EXPANDABLE MOLDING INSERT APPARATUS AND METHOD

(75) Inventor: Roger C. Knox, Spartanburg, SC (US)

(73) Assignee: Tindall Corporation, Spartanburg, SC (US)

( * ) Notice: Subject to any disclaimer, the term of this patent is extended or adjusted under 35 U.S.C. 154(b) by 4 days.

(21) Appl. No.: 13/079,425

(22) Filed: Apr. 4, 2011

(65) Prior Publication Data

US 2011/0241246 A1    Oct. 6, 2011

Related U.S. Application Data

(60) Provisional application No. 61/320,875, filed on Apr. 5, 2010.

(51) Int. Cl.
*B28B 7/30* (2006.01)

(52) U.S. Cl.
USPC ............ 425/283; 425/417; 425/468; 249/63; 249/65; 249/124; 249/147; 249/150; 249/151; 249/152; 249/178; 249/183; 249/186

(58) Field of Classification Search
CPC ............ B28B 7/30; B28B 7/34; B29C 33/44; B29C 39/26; B29C 39/265; F16B 13/063
USPC ................ 425/108, 283, 414, 417, 466–469, 425/DIG. 14; 249/63, 65, 124, 125, 147, 249/150–152, 165, 166, 178, 179, 183, 249/186; 411/29, 30, 44, 80.1, 80.2, 80.5, 411/80.6
See application file for complete search history.

(56) References Cited

U.S. PATENT DOCUMENTS

| 1,353,813 | A | * | 9/1920 | Hughes | 249/83 |
| 1,566,903 | A | * | 12/1925 | Durst | 249/65 |
| 2,234,784 | A | * | 3/1941 | Stolz | 249/179 |
| 3,437,309 | A | * | 4/1969 | Tausanovitch | 249/216 |
| 3,490,329 | A | * | 1/1970 | Pratorius | 411/441 |

(Continued)

FOREIGN PATENT DOCUMENTS

| CH | 673792 A5 * | 4/1990 | ............... B21J 15/12 |
| DE | 3315451 A1 * | 10/1984 | ............... F16B 13/06 |

(Continued)

OTHER PUBLICATIONS

Translation of JP 2003-266417.*

*Primary Examiner* — Dimple Bodawala
(74) *Attorney, Agent, or Firm* — The Tracy IP Law Firm, PLLC

(57) ABSTRACT

An expandable molding insert apparatus and corresponding method are provided. The insert apparatus may be expandable between a first uncompressed position with a first diameter and a second compressed position with a second, larger diameter due to axial decompression and compression, respectively, of the insert apparatus. For example, the insert apparatus may include an inner rod, an outer jacket, and a compression member. The compression member may be configured to provide axial compression to the outer jacket, such that the outer jacket may be adjusted between a first uncompressed position with a first outer diameter and a second compressed position with a second, larger outer diameter. The insert apparatus of the present disclosure facilitates withdrawal of the insert apparatus from a molded component, requires a minimal number of mechanical components, and provides for ease of actuation when the insert apparatus is utilized during a molding process.

34 Claims, 4 Drawing Sheets

(56) References Cited

U.S. PATENT DOCUMENTS

| | | | | |
|---|---|---|---|---|
| 3,523,552 | A | * | 8/1970 | Ogden .................... 137/592 |
| 3,613,168 | A | * | 10/1971 | Rowland et al. ........... 425/126.1 |
| 3,651,180 | A | * | 3/1972 | Glueckert ................ 264/51 |
| 3,656,732 | A | | 4/1972 | St. John |
| 3,891,022 | A | * | 6/1975 | Cola ..................... 164/528 |
| 3,973,749 | A | | 8/1976 | Friedl et al. |
| 4,135,432 | A | * | 1/1979 | Schalge et al. ........... 411/80.6 |
| 4,157,807 | A | * | 6/1979 | McCluskey ............... 249/177 |
| 4,245,545 | A | * | 1/1981 | Freeman ................. 411/342 |
| 4,286,766 | A | | 9/1981 | von Holdt |
| 4,721,326 | A | * | 1/1988 | Massos et al. ............ 280/124.134 |
| 4,919,608 | A | | 4/1990 | Catalanotti et al. |
| 5,266,137 | A | * | 11/1993 | Hollingsworth ........... 156/156 |
| 5,816,760 | A | * | 10/1998 | Mattner et al. ........... 411/30 |
| 5,941,668 | A | * | 8/1999 | Kaibach et al. ........... 411/60.2 |
| 5,980,174 | A | * | 11/1999 | Gallagher et al. ......... 411/55 |
| 6,027,292 | A | * | 2/2000 | Raber .................... 411/71 |
| 6,105,924 | A | | 8/2000 | Carr |
| 6,457,922 | B1 | * | 10/2002 | Tsai ..................... 411/55 |
| 6,808,154 | B2 | | 10/2004 | Koren |
| 2002/0106256 | A1 | * | 8/2002 | Kaibach et al. ........... 411/60.1 |
| 2004/0253075 | A1 | * | 12/2004 | Liebig et al. ............ 411/57.1 |
| 2007/0172328 | A1 | * | 7/2007 | Houck et al. ............. 411/60.2 |
| 2009/0307998 | A1 | | 12/2009 | Zavitz et al. |
| 2009/0308006 | A1 | | 12/2009 | Zavitz et al. |
| 2009/0308019 | A1 | | 12/2009 | Knox et al. |
| 2010/0316465 | A1 | * | 12/2010 | Gillis et al. ............ 411/29 |

FOREIGN PATENT DOCUMENTS

| | | | | |
|---|---|---|---|---|
| DE | 196 03 682 A1 | * | 8/1997 | ............ F01F 9/11 |
| EP | 0067941 A2 | * | 4/1982 | ............ E21D 21/00 |
| FR | 2575209 A1 | * | 6/1986 | ............ E04G 17/16 |
| GB | 2109433 A | * | 6/1983 | ............ F16B 5/00 |
| JP | 10-272613 A | * | 10/1998 | ............ B28B 7/32 |
| JP | 2003266417 A | * | 9/2003 | ............ B28B 7/32 |

* cited by examiner

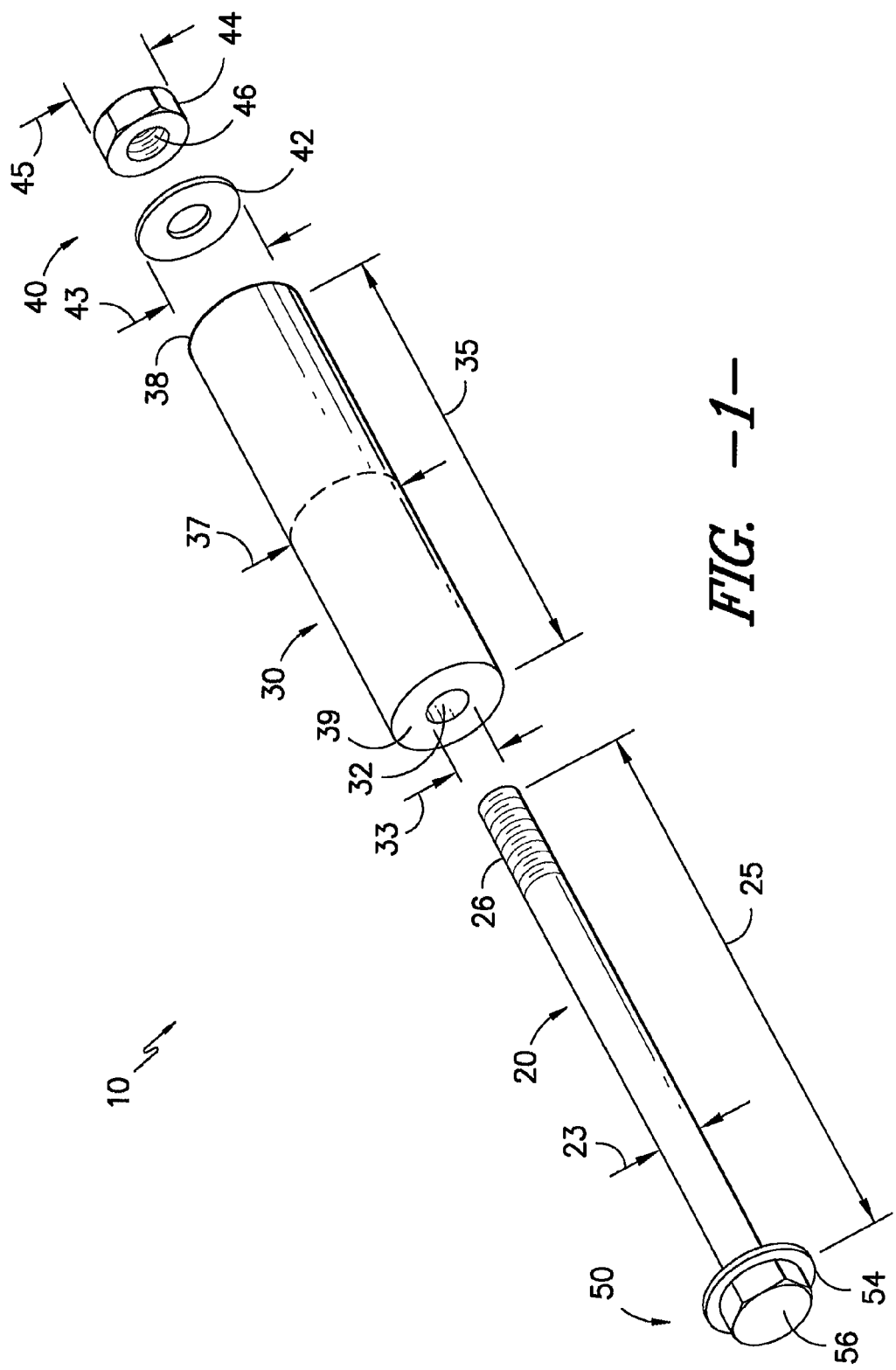
FIG. -1-

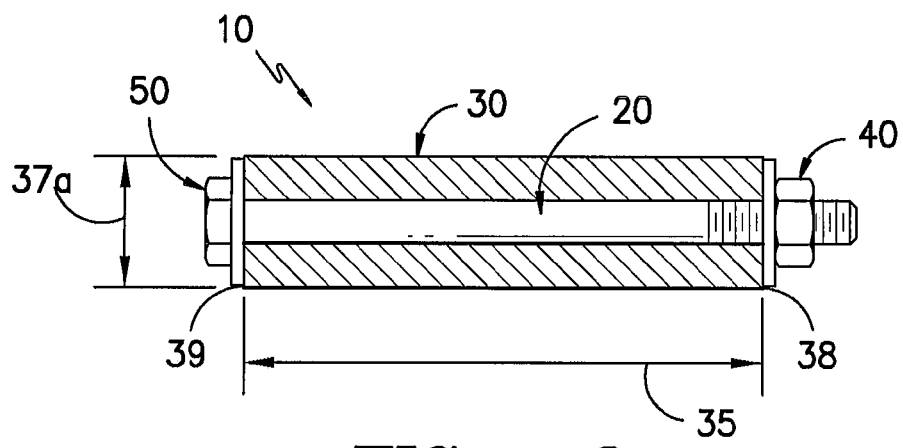
FIG. -2-
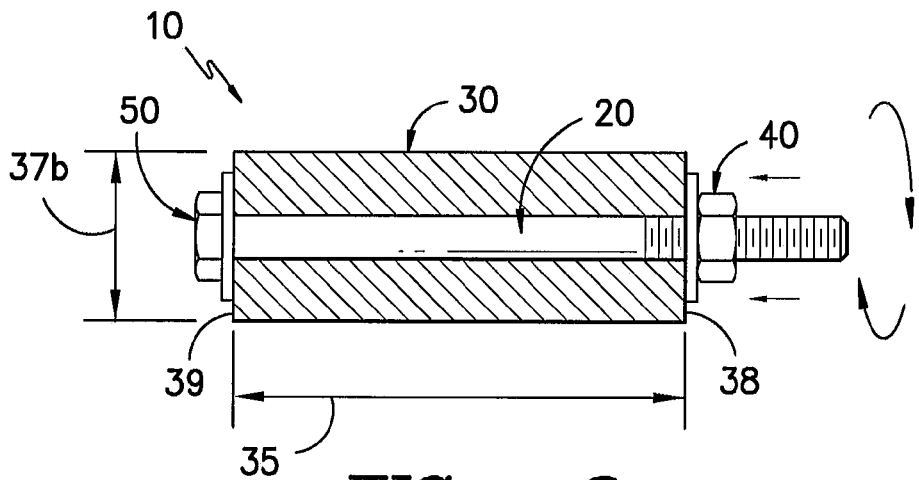
FIG. -3-
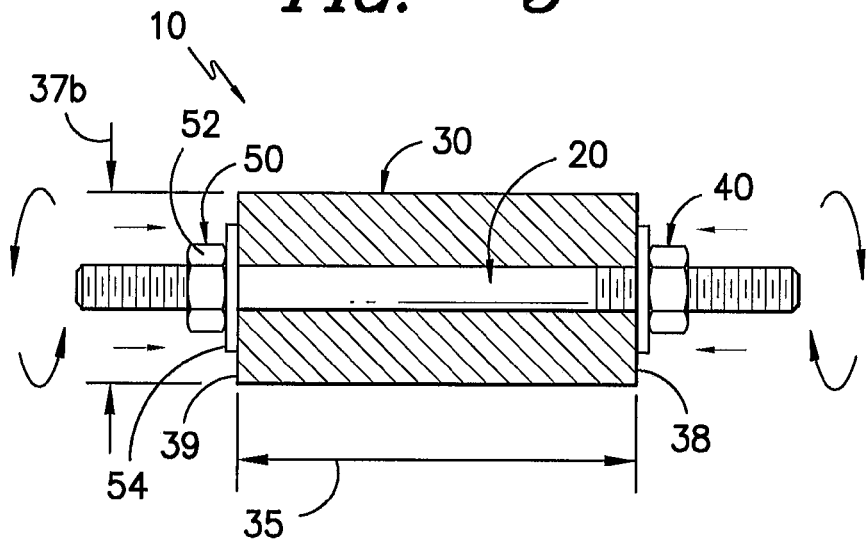
FIG. -4-

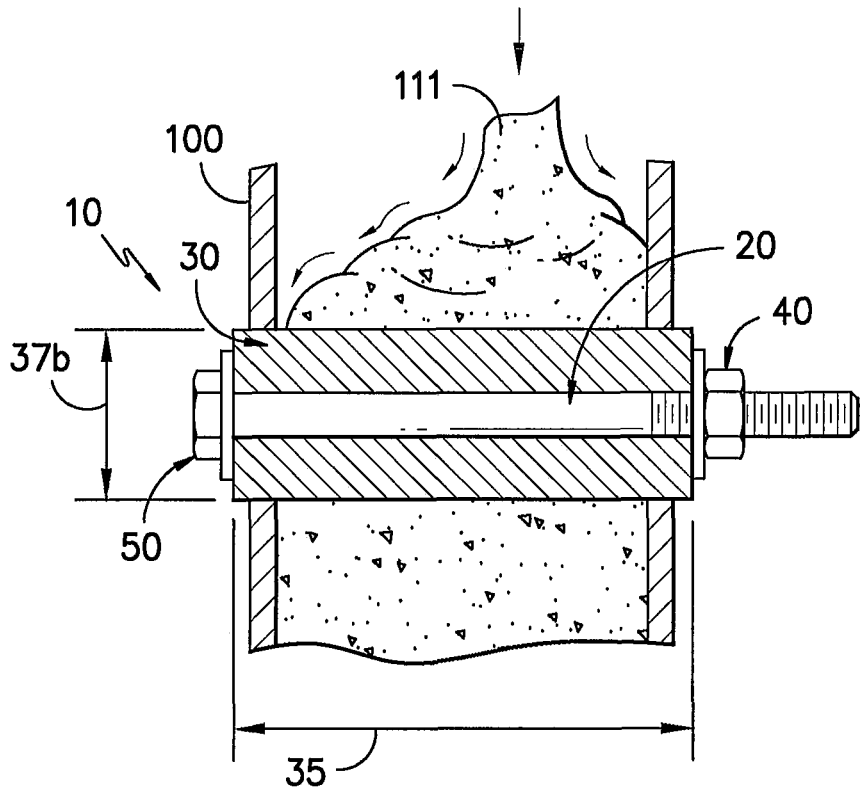
FIG. -5-
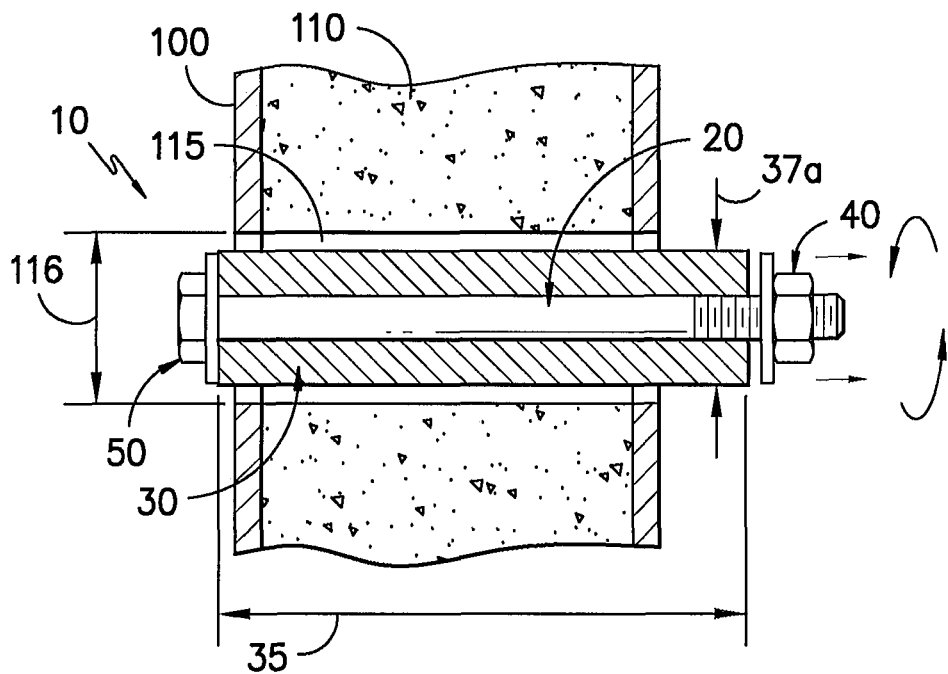
FIG. -6-

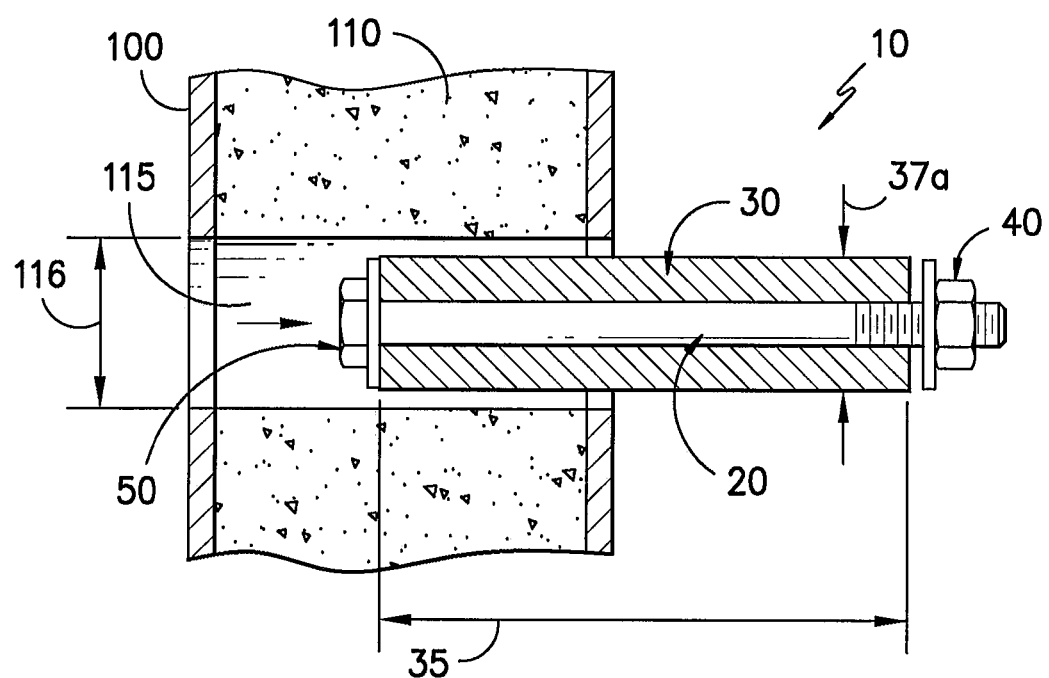
FIG. -7-

EXPANDABLE MOLDING INSERT APPARATUS AND METHOD

PRIORITY CLAIM

This application claims the benefit of previously filed U.S. Provisional Patent Application entitled "EXPANDABLE MOLDING INSERT APPARATUS AND METHOD," assigned U.S. Ser. No. 61/320,875, filed Apr. 5, 2010, and which is incorporated herein by reference for all purposes.

FIELD OF THE INVENTION

The present subject matter relates generally to molded components, and more specifically to expandable insert apparatuses and related methods for forming conduits within molded components.

BACKGROUND OF THE INVENTION

Mold cores are widely utilized in the molding art to form hollow elements in molded components. For example, cores may be utilized in conjunction with molds to cast concrete pipes or buckets, hollow columns, or any molded components that require a conduit, passageway, or hollowed out aspect therein. For example, molded components that may utilize mold cores include tower base supports, such as staves or other supports or support components. Examples of such molded components may be disclosed in, for example, Zavitz et al. (U.S. Pat. App. Pub. No. 2009/0307998), Zavitz et al. (U.S. Pat. App. Pub. No. 2009/0308006), and Knox et al. (U.S. Pat. App. Pub. No. 2009/0308019).

Further, technology related to mold cores has advanced generally to the use of expandable and collapsible mold cores which facilitate withdrawal of the mold core from the molded component. Various different styles of expandable and collapsible mold cores are known in the art. Generally, such mold cores expand and collapse radially due to the application of radial expansion forces. For example, see St. John (U.S. Pat. No. 3,656,732), which discloses a selectively radially expandable core for casting concrete pipe. Another example of a mold core that expands radially due to the application of radial expansion forces is provided by Carr (U.S. Pat. No. 6,105,924). The following patents provide further examples of mold cores that are radially expandable due to the application of radial expansion forces. For example, Friedl et al. (U.S. Pat. No. 3,973,749), discloses a reusable hollow formwork element for producing concrete structures, such as concrete pipelines, which can be radially expanded through the inflation of element cavities. von Holdt (U.S. Pat. No. 4,286,766), discloses a radially collapsible mold core that permits molding of objects such as straight-walled buckets. Catalanotti et al. (U.S. Pat. No. 4,919,608), discloses a molding apparatus with a radially collapsible core. Koren (U.S. Pat. No. 6,808,154), discloses a mold and molding apparatus wherein, to remove the mold, a vacuum is applied to an inner area of the mold, causing a flexible inner mold to separate from the molding material and conform to an extraction member, permitting removal.

The subject matter of each of the above published patent related documents is fully incorporated herein by reference, and for all purposes.

While such expandable and collapsible mold cores generally permit the withdrawal of the mold cores from molded components, the radially expansive components of the cores may be difficult to utilize during the molding process. For example, many known mold cores include a large number of mechanical components which may be broken or damaged during expansion or during the molding process. Further, many of the radially expansive components of known mold cores may be difficult to access and actuate during and after the molding process, preventing or hindering the withdrawal of the mold cores from the molded components.

Thus, an expandable insert apparatus that facilitates withdrawal of the insert apparatus from a molded component would be desired in the art. For example, an expandable insert apparatus that does not require a large number of fragile mechanical components would be advantageous. Further, an expandable insert apparatus that includes easily accessible and usable expansion components would be desirable.

SUMMARY OF THE INVENTION

Aspects and advantages of the present subject matter will be set forth in part in the following description, or may be apparent from the description, or may be learned through practice of the present subject matter.

The present disclosure recognizes and addresses the above-noted drawbacks and disadvantages of typical prior art mold cores.

It is a general object of the present disclosure to provide an improved expandable insert apparatus and an improved method for forming a conduit within a molded component. It is a more specific object of the present disclosure to provide an insert apparatus that is expandable between a first uncompressed position with a first diameter and a second compressed position with a second, larger diameter due to alternating axial decompression and compression, respectively, of the insert apparatus.

Thus, the present disclosure is directed to expandable molding insert apparatuses and methodology. An exemplary insert apparatus may be utilized with a mold to form a conduit within or through a component formed in the mold, regardless of the intended end use of the component.

A present exemplary insert apparatus may include an inner rod, an outer jacket, and a compression member. The compression member may be configured to provide axial compression to the outer jacket, such that the outer jacket may be adjusted between a first uncompressed position with a first outer diameter and a second compressed position with a second, larger outer diameter. For example, as an axial compressive force is applied to the outer jacket by the compression member, the force may cause the length of the outer jacket to be reduced. The reduction in the length of the outer jacket may cause the outer diameter of the outer jacket to radially expand from a first outer diameter to a second, larger outer diameter.

The compression member may in some instances and embodiments be provided with features such as a nut and a washer. The nut may be threadably rotated with respect to the inner rod such that it travels axially along the length of the inner rod in the first direction, applying an axial compressive force or causing the washer to apply the axial compressive force to the outer jacket.

When the insert apparatus is in the second, compressed position, it may be advantageously utilized in a mold, in accordance with the present subject matter. For example, an exemplary present insert apparatus may be placed into the mold to form a conduit having a diameter that is substantially equal to the second outer diameter of the outer jacket. After a component substrate has been poured and allowed to cure or harden into a molded component in the mold, the insert apparatus may be withdrawn from the component and the mold. To facilitate withdrawal of the insert apparatus without damaging the component, the axial compressive force of the compression member may be reduced such that the diameter of the outer jacket is radially reduced from the second outer diameter to the first outer diameter. Because the first outer diameter is smaller than the diameter of the conduit, the insert apparatus in the first, uncompressed position may become disengaged from the conduit. Once the insert apparatus is disengaged from the conduit, it may be easily withdrawn from the component without damaging the poured/cured component.

One present exemplary embodiment in accordance with the present subject matter relates to an expandable molding insert apparatus for forming conduits within molded components. Such insert apparatus preferably comprises an inner rod; an outer jacket; and a compression member. Such compression member is preferably configured to selectively provide axial compression to the outer jacket, for adjusting such outer jacket between a first uncompressed position with a first outer diameter and a second compressed position with a second, larger outer diameter, whereby adjusting such outer jacket to such first uncompressed position thereof facilitates withdrawal of the insert apparatus from a molded component.

Further, for some such insert apparatuses, such axial compression to such outer jacket may comprise an axial compressive force applied to such outer jacket by such compression member, so as to cause the length of such outer jacket to be reduced for causing the outer diameter of such outer jacket to radially expand from such first outer diameter to such second, larger outer diameter.

In certain of such insert apparatuses, such inner rod may be threaded; and such compression member may comprise a nut threadably rotatable on such inner rod such that such nut travels axially along the length of such inner rod in a first direction so as to apply such axial compressive force to such outer jacket. Further, for some variations of the foregoing, such compression member may further include a washer received on such inner rod between such nut and such outer jacket, so that travel of such nut in such first direction causes such washer to apply such axial compressive force to such outer jacket.

In other present alternatives of the foregoing, such compression member may be mounted on such inner rod and disposed adjacent an end of such outer jacket, such compression member having a diameter that is substantially at least equal to the diameter of such outer jacket in such first uncompressed position thereof, so as to axially compress such outer jacket substantially evenly throughout the diameter thereof. In some of such variations, such compression member may further form a seal for such end of such outer jacket, so that formation materials to be poured into an associated mold do not enter such insert apparatus.

Per yet other present variations, such compression member may comprise cylinder means that may be actuated to provide axial compression to such outer jacket. In some such variations, such cylinder means may comprise one of a pneumatic or hydraulic cylinder, and may comprise an associated rod or piston component for actuation of same.

In still further present variations, such compression member may alternatively be mounted on such inner rod and disposed adjacent one end of such outer jacket; and such insert apparatus may further include a base member mounted on such inner rod disposed adjacent an end of such outer jacket opposite such one end thereof. In certain of such variations, such base member may be configured to facilitate the axial compression of such outer jacket, and may have a diameter that is substantially at least equal to the diameter of such outer jacket in such first uncompressed position thereof so as to axially compress such outer jacket substantially evenly throughout the diameter thereof.

In alternatives of the foregoing variations, such base member may comprise a stationary base member. Yet further, such stationary base member may comprise a head of such inner rod. Still further, such base member may further include a washer disposed adjacent such head.

In other present variations, such inner rod may be threaded; and such base member may comprise a nut threadably rotatable on such inner rod such that such nut travels axially along the length of such inner rod in a direction so as to apply such axial compressive force to such outer jacket.

In some present alternatives, such inner rod may be threaded; and such base member may include a washer, and further include a locking nut threaded on such inner rod.

In various of present alternatives, such inner rod may have a predetermined cross-section, and may have threads extending generally along at least a portion of the length thereof. In some alternatives thereof, such predetermined cross-section may comprise a polygonal cross-section, and such threads may extend generally along the entire length of such inner rod. In other present alternatives, such inner rod may have a substantially constant diameter throughout the entire length thereof.

In other present variations, such inner rod may be formed of one of metal, metal-alloy, plastics, polymers, and ceramics.

Per other present alternative features, such outer jacket may comprise a single integral component having a length substantially equal to the length of such inner rod. In different present alternatives, such outer jacket may comprise a plurality of respective components received along the length of such inner rod. In other present variations, such outer jacket may have a predetermined cross-section, and may form a bore for receipt of such inner rod therein. In certain of such variations, such insert apparatus may further include a plurality of inner rods, and such outer jacket may further form a corresponding plurality of bores for respective receipt of such inner rods.

Per yet other present variations, such outer jacket may comprise deformable material that may be axially compressed. In certain of such variations, such outer jacket may comprise polymer material.

In other present alternatives, such outer jacket may comprise at least one of rubber and polymer materials, and may have a predetermined durometer rating in a range of from approximately 40 A to approximately 90 A.

Yet another present exemplary embodiment of the present subject matter relates to a controllably expandable molding insert for the creation of passageways through hardened cast components formed by molding component substrate within a mold. Such embodiment preferably comprises an inner shaft, having a length, with respective opposite ends and with external threading over at least a portion of such length thereof; an outer jacket having a central bore for receipt of such inner shaft, such outer jacket formed of compressible material having a predetermined hardness; and compression means. Preferably such compression means selectively provide axial compression, and release of such compression, to such outer jacket, for moving such outer jacket between a first axially uncompressed position thereof having a first outer diameter, and a second axially compressed position thereof having a second, larger outer diameter. Advantageously, with such embodiment, placing such outer jacket in such axially first uncompressed position thereof after hardening of a component cast around such insert in an associated mold facilitates withdrawal of such insert from such associated mold.

In variations of the foregoing embodiment, such compression means may include at least one nut threadably rotatable on such inner shaft such that such nut travels axially along the length of such inner shaft in a first direction so as to apply axial compressive force to such outer jacket.

In other present variations of the foregoing, such compression means may further include a washer received on such inner shaft between such nut and such outer jacket, so that travel of such nut in such first direction causes such washer to apply such axial compressive force to such outer jacket; and such washer may have a diameter that is substantially at least equal to the diameter of such outer jacket in such first uncompressed position thereof, so as to axially compress such outer jacket substantially evenly throughout the diameter thereof.

In some variations of the foregoing, such nut and washer may be received adjacent one end of such inner shaft, and such compression means further may include a base member received adjacent the opposite end of such inner shaft and configured for further selectively providing axial compression, and release of such compression, to such outer jacket.

In yet other present variations, such nut and washer may be received adjacent one end of such inner shaft, and such compression means may further include a second nut and washer received adjacent the opposite end of such inner shaft and configured for further selectively providing axial compression, and release of such compression, to such outer jacket.

In some present alternative variations of the foregoing, such compression means may include one of a pneumatic or hydraulic cylinder that may be actuated to provide axial compression to such outer jacket.

Per yet other present variations, such inner shaft and such central bore may have respective, mating predetermined polygonal cross-sections.

In other present alternatives, such inner rod may be formed of one of metal, metal-alloy, plastics, polymers, and ceramics; and such outer jacket may comprise deformable material that may be axially compressed.

It is intended that those of ordinary skill in the art, upon reviewing the complete disclosure herewith, will fully appreciate that the present subject matter equally is intended to encompass corresponding methodologies. One present exemplary method relates to a method for forming conduits within molded components. Such exemplary methodology preferably comprises providing a mold for formation of a molded component therein; positioning in such mold an insert apparatus expandable between a first uncompressed position with a first diameter and a second compressed position with a second, larger diameter due to axial decompression and compression, respectively, of the insert apparatus; axially compressing the insert apparatus to establish the second, larger diameter thereof; and pouring component formation materials into such mold.

In some variations of such exemplary method, the methodology may further include hardening such poured formation materials; axially decompressing the insert apparatus to establish the first diameter thereof; and removing the insert apparatus from the mold, so as to form a conduit through the molded component in the space previously occupied by the insert apparatus.

In yet other present variations, such component formation materials may comprise one of concrete or cement in a substantially flowable state; and such hardening step may comprise curing such formation materials.

Per yet other present variations, such insert apparatus may comprise an inner rod; an outer jacket; and a compression member, configured to selectively provide axial compression to the outer jacket, for adjusting such outer jacket between the first uncompressed position thereof with a first outer diameter and the second compressed position thereof with a second, larger outer diameter. Further, per such variations, such outer jacket may comprise deformable material that may be axially compressed.

In certain alternatives of such variations, such deformable material may comprise at least one of rubber and polymer materials, and may have a predetermined durometer rating in a range of from approximately 40 A to approximately 90 A; and such predetermined durometer rating may be selected so as to result in radial expansion of such second, larger diameter of such outer jacket over such first diameter thereof in a range of from approximately 3% to approximately 15%.

In other present variations, such predetermined durometer rating may be selected at least in part based on the desired amount of required axial compression for a given mold configuration in order to achieve a desired amount of resulting radial expansion, and in part based on the amount of weight of the component formation materials to which the insert apparatus is subjected for use with a given mold configuration. In yet other present variations of present exemplary methodologies, such molded component may comprise tower base supports for wind turbines.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification. The accompanying drawings, which are incorporated in and constitute a part of this specification, illustrate embodiments of the present subject matter and, together with the description, serve to explain the principles of the present subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 is an exploded view of one exemplary embodiment of an insert apparatus of the present disclosure;

FIG. 2 is a cross-sectional view of one exemplary embodiment of an insert apparatus of the present disclosure in a first, uncompressed position thereof;

FIG. 3 is a cross-sectional view of one exemplary embodiment of an insert apparatus of the present disclosure in a second, compressed position thereof;

FIG. 4 is a cross-sectional view of another exemplary embodiment of an insert apparatus of the present disclosure in a second, compressed position thereof;

FIG. 5 is a cross-sectional view of one exemplary embodiment of an insert apparatus of the present disclosure in a second, compressed position thereof in a mold;

FIG. 6 is a cross-sectional view of one exemplary embodiment of an insert apparatus of the present disclosure in a first, uncompressed position thereof in a mold; and FIG. 7 is a cross-sectional view of one exemplary embodiment of an insert apparatus of the present disclosure in a first, uncompressed position thereof as such insert apparatus is withdrawn from a mold, in accordance with present exemplary methodology.

DETAILED DESCRIPTION OF THE PREFERRED EMBODIMENTS

Reference now will be made in detail to exemplary embodiments of the present subject matter, one or more examples of which are illustrated in the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

FIGS. 1 through 7 illustrate exemplary embodiments of an expandable molding insert apparatus generally 10 of the present disclosure. In general, insert apparatus 10 may be utilized with a mold 100 to form a conduit 115 within or through a component 110 formed in the mold 100. Further, the insert apparatus 10 may be configured such that it can be withdrawn from the molded component 110 without damaging the component 110 after the component 110 has substantially cured or hardened in the mold 100. For example, alternating axial decompression and compression of the insert apparatus 10 may cause insert apparatus 10 to adjust radially between a first, uncompressed position with a first diameter and a second, compressed position with a second, larger diameter. The insert apparatus 10 may be utilized within a mold generally 100 to form a conduit 115 within or through a component 110 when the insert apparatus 10 is in the second, compressed position. After the component 110 has substantially cured or hardened in the mold 100, the insert apparatus 10 may be adjusted to the first, uncompressed position to facilitate withdrawal of insert apparatus 10 from mold 100.

As represented by present FIG. 1, the insert apparatus 10 may include, for example, an inner rod or shaft 20, an outer jacket 30, and a compression member generally 40. The inner rod 20 may have an outside diameter 23 and a length 25. The outside diameter 23, for example, may be a substantially constant diameter 23 throughout the length 25 of the inner rod 20. Alternately, however, per the present subject matter, the diameter 23 of the inner rod 20 may be tapered along the length 25 of the inner rod 20.

In exemplary embodiments, the inner rod 20 may have a generally round or oval cross-section. Alternatively, however, the inner rod 20 may have, for example, a generally rectangular or square cross-section having a width, rather than a diameter 23. Further, in other embodiments, the inner rod 20 may have a triangular cross-section, or any other polygonal cross-section known in the art, other shaped cross-section.

In an exemplary embodiment, the inner rod 20 may be a threaded rod having threads 26. For example, the threads 26 may extend generally through the entire length 25 of the inner rod 20, or may extend generally through only a portion of the length 25 of the inner rod 20. The threads 26 may be configured to mate with inner threads 46 on the compression member 40, as otherwise discussed in detail herein. Alternatively, however, the inner rod 20 may have a substantially smooth outer surface, or may have any surface texture known in the art. For example, in alternative embodiments, the inner rod 20 may be a rod of a pneumatic or hydraulic cylinder, or a rod of any other mechanism that may be actuated to provide axial compression to the outer jacket 30, as discussed below.

In exemplary embodiments, the inner rod 20 may be formed of a metal or metal-alloy substrate, such as steel, carbon steel, or stainless steel. In alternative embodiments, however, the inner rod 20 may be formed from any material or materials known in the art, such as, for example, plastics, polymers, ceramics, or the like.

The outer jacket 30 may have a length 35 and an outer diameter 37. In one exemplary embodiment, for example, the length 35 of the outer jacket 30 may be substantially equal to the length 25 of the inner rod. In other exemplary embodiments, however, the length 35 of the outer jacket 30 may be shorter than or longer than the length 25 of the inner rod 20.

In exemplary embodiments, the outer jacket 30 may be a singular, integral component. Alternatively, as shown by the dotted line in FIG. 1, the outer jacket 30 may include more than one jacket component. The various components may have similar or different lengths and diameters, and may, for example, have different cross-sections and hardnesses, as discussed below.

The outer diameter 37 (see generally present FIG. 1) may be a first outer diameter 37a (see generally present FIGS. 2, 6, and 7) of the outer jacket 30 when the outer jacket 30 is in a first, uncompressed position, and a second, larger outer diameter 37b (see generally present FIGS. 3 through 5) of the outer jacket 30 when the outer jacket 30 is in a second, compressed position, as otherwise discussed in detail herein. The outer diameter 37 may be a substantially constant outer diameter 37 throughout the length 35 of the outer jacket 30, or may be tapered along the length 35 of the outer jacket 30.

In exemplary embodiments, the outer jacket 30 may have a generally round or oval cross-section. Alternatively, however, the outer jacket 30 may have, for example, a generally rectangular or square cross-section having an outer width, rather than an outer diameter 37. Further, in other embodiments, the outer jacket 30 may have a triangular cross-section, or any other polygonal cross-section known in the art, or other shaped cross-section.

The outer jacket 30 may define a bore 32 therethrough. For example, the bore 32 may extend through the entire length 35 of the outer jacket 30. Alternatively, however, the bore 32 may extend through only a portion of the length 35 of the outer jacket 30.

In exemplary embodiments, the bore 32 may have a cross-section that is substantially similar to the cross-section of the inner rod 20. For example, in exemplary embodiments, the bore 32 may have a generally round or oval cross-section. Alternatively, however, the bore 32 may have, for example, a generally rectangular or square cross-section having an outer width, rather than an inner diameter 33. Further, in other embodiments, the bore 32 may have a triangular cross-section, or any other polygonal cross-section known in the art.

The outer jacket 30 may thus have an inner diameter 33. In an exemplary embodiment, the inner diameter 33 may be substantially equivalent to the diameter 23 of the inner rod. Alternatively, however, the inner diameter 33 may be larger than the diameter 23 of the inner rod 20. Further, in exemplary embodiments, the inner diameter 33 may be a substantially constant inner diameter 33 throughout the length 35 of the outer jacket 30. Alternatively, however, the inner diameter 33 of the outer jacket 30 may be tapered along the length 35 of the outer jacket 30.

Thus, the inner rod 20 may be inserted into the outer jacket 30 such that the inner rod 20 may be disposed generally within the bore 32 of the outer jacket 30. For example, in exemplary embodiments, the bore 32 may extend through the entire length 35 of the outer jacket 30, and the inner rod 20 may thus be disposed generally within the bore 32 and extend through the entire length 35 of the outer jacket 30. In alternative embodiments, the bore 32 may extend through only a portion of the length 35 of the outer jacket 30, and the inner rod 20 may thus be disposed generally within the bore 32 and extend through only a portion of the length 35 of the outer jacket 30. In further alternative embodiments, the outer jacket 30 may include a plurality of bores 32, such as a first bore 32 extending through a portion of the length 35 from end 38 of the outer jacket 30 and a second bore 32 extending through a portion of the length 35 from end 39 of the outer jacket 30. The insert apparatus 10 may further include a plurality of inner rods 20, and an inner rod 20 may be disposed generally within each bore 32 of the outer jacket 30.

In exemplary embodiments, the outer jacket 30 may be formed of a polymer material, such as polyurethane. For example, the outer jacket 30 may be a polyurethane tube. Alternatively, however, the outer jacket 30 may be formed of any deformable material, such as any material that may be axially compressed, as discussed in detail below. Further, the outer jacket 30 may have a hardness. For example, in certain embodiments, the outer jacket 30 may have a durometer hardness rating (or simply "durometer") in the range from approximately 40 A to approximately 90 A. In some embodiments, the outer jacket 30 may have a durometer in the range from approximately 40 A to approximately 60 A. In other embodiments, the outer jacket 30 may have a durometer in the range from approximately 60 A to approximately 70 A. However, it should be understood that the hardness of the outer jacket 30 is not limited to durometers in the range from approximately 40 A to approximately 90 A. For example, the outer jacket 30 may have any durometer below or softer than approximately 40 A, or any durometer above or harder than approximately 90 A.

The insert apparatus 10 may further include at least one compression member 40. The compression member 40 may be mounted to the inner rod 20 and disposed adjacent an end 38 of the outer jacket 30. The compression member 40 may be configured to provide axial compression to the outer jacket 30, such that the outer jacket 30 may be adjusted or manipulated between a first, uncompressed position with a first outer diameter 37a (see for example FIG. 2) and a second, compressed position with a second, larger outer diameter 37b (see for example FIG. 3). For example, in an exemplary embodiment, the compression member 40 may have a width or diameter that is substantially equal to or larger than the outer width or diameter 37 of the outer jacket 30. Thus, the compression member 40 may axially compress the outer jacket 30 substantially evenly throughout the width or diameter of the outer jacket 30. However, in alternative embodiments, the compression member 40 may have a width or diameter that is substantially smaller than the outer width or diameter 37 of the outer jacket 30, or otherwise sized relative to such diameter 37.

The compression member 40 may further provide a seal to the end 38 of the outer jacket 30. For example, when the insert apparatus 10 is in a second, compressed position thereof, as otherwise discussed in detail herein, the compression member 40 may provide axial compression to the outer jacket through the end 38. In such position, the compression member 40 seated against the end 38 may seal the end 38, such that when the insert apparatus 10 is placed in a mold 100 and a component substrate 111 is poured into the mold, as discussed in detail below, the component substrate 111 will be prevented from entering the insert apparatus 10 through the end 38 between the outer jacket 30 and inner rod 20.

In one exemplary embodiment, for example, the compression member 40 may include a nut 44. The nut 44 may include inner threads 46, which may be sized to threadably engage the threads 26 on the inner rod 20. The nut 44 may have an outer diameter generally 45. In various embodiments, the outer diameter 45 may be larger than, substantially equal to, or smaller than the outer diameter 37 of the outer jacket 30.

The compression member 40 may further include a washer 42. The washer 42 may be mounted to the inner rod 20 and disposed between the nut 44 and the end 38 of the outer jacket. The washer 42 may have an outer diameter 43. In an exemplary embodiment, the outer diameter 43 of the washer 42 may be substantially equal to the outer diameter 37 of the outer jacket 30. Alternatively, the outer diameter 43 of the washer 42 may be larger than the outer diameter 37 of the outer jacket 30, or smaller than the outer diameter 37 of the outer jacket 30.

In alternative embodiments, the compression member 40 may be, for example, a rod or piston of a pneumatic or hydraulic cylinder, or a rod, piston or other component of any other mechanism that may be actuated to provide axial compression to the outer jacket 30.

The insert apparatus 10 may further include a base member 50. The base member 50 may be mounted to the inner rod 20 and disposed adjacent an end 39 of the outer jacket 30 that is opposite the end 38. The base member 50 may be configured to facilitate the axial compression of the outer jacket 30 between the first, uncompressed position and the second, compressed position thereof. For example, in an exemplary embodiment, the base member 50 may have a width or diameter that is substantially equal to or larger than the outer width or diameter 37 of the outer jacket 30. Thus, the base member 50 may axially compress the outer jacket 30 substantially evenly throughout the width or diameter of the outer jacket 30. However, in alternative embodiments, the base member 50 may have a width or diameter that is substantially smaller than the outer width or diameter 37 of the outer jacket 30.

In an exemplary embodiment, the base member 50 may be a stationary base member 50, and may be configured to allow axial compression of the outer jacket 30 by the compression member 40 against the base member 50. For example, as shown in FIGS. 1 through 3 and 5 through 7, the base member 50 may be a head 56 of the inner rod 20. Further, in one embodiment, the base member 50 may include a washer 54 disposed adjacent the head 56. Alternatively, however, the base member 50 may include a nut 52, or a nut 52 and a washer 54, as discussed above with respect to the compression member 40. In certain embodiments, the nut 52 may be a locking nut. Further, in certain embodiments, the washer 54 may be a locking washer. As the compression member 40 provides axial compression to the outer jacket 30, the end 39 of the outer jacket 30 may be forced against the base member 50, and the stationary base member 50 may prevent movement of the outer jacket 30, thus causing the outer jacket 30 to compress in response to the axial compression by the compression member 40.

In an alternative exemplary embodiment, as shown in FIG. 4, the base member 50 may be a second compression member, and may be configured to further provide axial compression to the outer jacket 30, such that the outer jacket 30 may be adjusted between the first, uncompressed position with first outer diameter 37a and the second, compressed position with second, larger outer diameter 37b. For example, the base member 50 may include a nut 52, or a nut 52 and a washer 54, as otherwise discussed herein with respect to the compression member 40, and may be movable axially and oppositely of the compression member 40, such that the outer jacket 30 is compressed between the compression member 40 and the base member 50.

In alternative embodiments, the base member 50 may be, for example, a rod or piston of a pneumatic or hydraulic cylinder, or a rod, piston or other component of any other mechanism that may be actuated to provide axial compression to the outer jacket 30.

The base member 50 may further provide a seal to the end 39 of the outer jacket 30. For example, when the insert apparatus 10 is in a second, compressed position, as discussed in detail herein, the base member 50 may facilitate axial compression of the outer jacket through the end 39, as discussed herein. In such position, the base member 50 seated against the end 39 may seal the end 39, such that when the insert apparatus 10 is placed in a mold 100 and a component substrate 111 is poured into the mold, as discussed in detail herein, the component substrate 111 will be prevented from entering the insert apparatus 10 through the end 39 between the outer jacket 30 and inner rod 20.

As discussed above, the insert apparatus 10 may be adjustable between a first, uncompressed position and a second, compressed position. In the first, uncompressed position as shown in FIGS. 1, 2, 6, and 7, the outer jacket 30 may be subjected to only minimal or no compressive forces, and may have a first outer diameter 37a, as discussed above. For example, the compression member 40 may simply be disposed adjacent the end 38, providing only minimal compressive force or no compressive force to the outer jacket 30. Further, the outer jacket 30 may simply be disposed adjacent base member 50, such that base member 50 is providing minimal or no compressive force to outer jacket 30 through end 39.

In the second, compressed position as shown in FIGS. 3, 4, and 5, however, the outer jacket 30 may be subjected to an axial compressive force by the compression member 40, or by the compression member 40 and base member 50, such that the length 35 of the outer jacket 30 is reduced. For example, the compression member 40 may be movable such that it travels axially along the length of the inner rod in a first direction, as shown in FIGS. 3 and 4, applying an axial compressive force to the outer jacket 30 through the end 38. In an exemplary embodiment, for example, the nut 44 may be threadably rotated with respect to the inner rod 20 such that it travels axially along the length of the inner rod in the first direction, applying the axial compressive force or causing the washer 42 to apply the axial compressive force to the outer jacket 30. Further, the base member 50 may facilitate the axial compressive force by either being movable oppositely to the compression member 40 and applying an axial compressive force to the outer jacket 30 through the end 39 as shown in FIG. 4, or by remaining stationary as shown in FIG. 3, such that the end 39 of the outer jacket 30 is forced against the base member 50. As the axial compressive force causes the length 35 of the outer jacket 30 to be reduced, the outer diameter 37 of the outer jacket 30 may be radially expanded from the first, outer diameter 37a to a second, larger outer diameter 37b.

Per the present subject matter, when the insert apparatus 10 is in the second compressed position, it may be utilized in a mold 100, as shown in FIGS. 5 through 7. For example, the insert apparatus 10 may be placed in the mold 100 to form a conduit 115 within or through a component 110 formed in the mold 100. In an exemplary embodiment, the mold 100 may be a concrete or cement based component mold 100. For example, the mold 100 may be utilized to form components 110 for tower base supports, such as staves or other supports or support components.

The insert apparatus 10 may be placed in the mold 100 to form a conduit 115 having a diameter 116 that is substantially equal to the second outer diameter 37b of the outer jacket 30. In an exemplary embodiment, the conduit 115 may be formed within the components 110 to allow for the inclusion of cables or tendons within the conduit 115. For example, the cables or tendons may be utilized in a post tensioning system for the components 110, or may be provided for other purposes, either mechanical, electrical, or both in nature.

After the insert apparatus 10 is placed in the mold 100, a component substrate 111 may be poured into the mold 100, as shown in FIG. 5. For example, the component substrate may be concrete or cement in a substantially flowable state. The component substrate 111 may be allowed to flow into the mold 100 and around the insert apparatus 10. In an exemplary embodiment, the component substrate 111 may substantially surround the insert apparatus 10, thus allowing the insert apparatus 10 to form conduit 115 within the component substrate.

As the component substrate 111 surrounds the insert apparatus 10 in the mold 100, the component substrate 111 may cause the outer jacket 30 of the insert apparatus 10 to further deform. For example, the head pressure caused by the weight of the component substrate 111 may provide a compressive force against portions of the outer jacket 30, such that the outer jacket 30 may become deformed. In one embodiment, the head pressure may cause the outer diameter 37b of the outer jacket 30 to become tapered. The conduit 115 may thus be formed with a diameter 116 that is tapered or deformed similarly to the outer diameter 37b of the outer jacket 30. Thus, it should be understood that, when the insert apparatus 10 is in the second, compressed position having a second outer diameter 37b, the second outer diameter 37b may vary along the length 35 of the outer jacket 30 as the outer jacket 37 is deformed by the component substrate 111.

It should further be understood that the hardness or durometer of the outer jacket 30 may be selected to allow or to prevent or lessen deformation or tapering of the outer jacket 30. For example, to prevent or lessen deformation or tapering, a relatively harder material, such as a material with a relatively higher durometer as discussed above, may be selected for the outer jacket 30. Alternatively, to allow a desired degree of deformation or tapering, a relatively softer material, such as a material with a relatively lower durometer as discussed above, may be selected for the outer jacket 30. It will be understood by those of ordinary skill in the art that the axial compressive force to be applied to the outer jacket 30 may be adjusted as needed or desired, to accommodate particular hardnesses used in different embodiments of the present subject matter.

After component substrate 111 is poured into the mold 100, the component substrate 111 may then be allowed to cure or harden in the mold 100, such that the component substrate 111 becomes a substantially cured or hardened component 110 including a conduit 115, as represented for example in present FIG. 6.

After the molded component 110 has substantially cured or hardened in the mold 100, the insert apparatus 10 may be withdrawn from the component 110. To facilitate withdrawal of the insert apparatus 10 without damaging the component 110, the axial compressive force of the compression member 40 and the base member 50 may be reduced such that the diameter of the outer jacket 30 is radially reduced from the second outer diameter 37b to the first outer diameter 37a, as shown in FIG. 6, or to some diameter less than that of second outer diameter 37b. For example, the compression member 40 may be movable such that it travels axially along the length of the inner rod in a second direction, reducing the axial compressive force applied to the outer jacket 30 through the end 38.

In an exemplary embodiment, for example, the nut 44 may be threadably rotated with respect to the inner rod 20 such that it travels axially along the length 25 of the inner rod 20 in the second direction. As the nut 44 travels axially in the second direction, the compressive force on the outer jacket 30 may be reduced. Further, the base member 50 may facilitate the reduction in the axial compressive force on the outer jacket 30 by either being movable oppositely to the compression member 40, reducing the axial compressive force to the outer jacket 30 through the end 39, or by remaining stationary such that the force on the base member 50 through the end 39 of the outer jacket 30 is reduced. The reduction in axial compressive force on the outer jacket 30 may cause the length 35 of the outer jacket 30 to increase. Such reduction in the length 35 may cause the outer diameter 37 of the outer jacket 30 to be radially reduced from the second outer diameter 37b to the first outer diameter 37a, such that the insert apparatus 10 is adjusted from the second, compressed position to the first, uncompressed position (or to a similar position). Because the first outer diameter 37a is smaller than the diameter 116 of the conduit 115, the insert apparatus 10 in the first, uncompressed position may become disengaged from the conduit 115, as shown in FIG. 6. Once the insert apparatus 10 is disengaged from the conduit 115, it may be easily withdrawn from the component 110 without damaging the component 110, as shown in FIG. 7, all in accordance with present methodology.

It should be understood that the amount of radial expansion of the outer jacket 30 caused by axial compression of the compression member 40 and, optionally, the base member 50, may vary according to the durometer of the outer jacket 30. Physical measurements/parameters of a particular embodiment may also be a factor. For example, in exemplary embodiments, axial compression in the range from approximately 5% to approximately 25% may yield radial expansion in the range from approximately 3% to approximately 15%. However, by relatively increasing the durometer of the outer jacket 30, the amount of axial compression required to yield a similar radial expansion may increase. Further, by relatively decreasing the durometer of the outer jacket 30, the amount of axial compression required to yield a similar radial expansion may decrease. It should further be understood that the amounts and relative ranges of axial compression and resulting radial expansion of the outer jacket 30 are not limited to the ranges discussed herein. For example, the outer jacket 30 may be subjected to axial compression in any range or amount, and this axial compression may result in a relative radial expansion.

The insert apparatus 10 of the present disclosure facilitates easy withdrawal from a molded component 110. Further, the insert apparatus 10 advantageously requires a minimal number of mechanical components, and provides for ease of actuation when the insert apparatus 10 is utilized during a molding process.

The present disclosure also provides a method for forming a conduit 115 in a molded component 110. The method may include, for example, the step of axially compressing an insert apparatus 10 from a first, uncompressed position to a second, compressed position, as discussed above. For example, axial compression of the insert apparatus 10 from the first, uncompressed position to the second, compressed position may cause an outer diameter 37 of the insert apparatus 10, such as of the outer jacket 30, to radially expand from a first outer diameter 37a to a second, larger outer diameter 37b.

The method may additionally include the steps of placing the insert apparatus 10 into a mold 100, pouring a component substrate 111 into the mold 100, and allowing the component substrate 111 to substantially cure or harden into a molded component 110, as discussed above.

Further, the method may include the step of axially decompressing the insert apparatus from the second, compressed position to the first, uncompressed position, as discussed above. For example, axial decompression of the insert apparatus 10 from the second, compressed position to the first, uncompressed position may cause the outer diameter 37 of the insert apparatus 10, such as of the outer jacket 30, to be radially reduced from the second outer diameter 37b to the first outer diameter 37a. As discussed above, the insert apparatus 10 in the first uncompressed position may become disengaged from the conduit 115.

Finally, the method may include the step of withdrawing the insert apparatus 10 from the molded component 110. As discussed above, the insert apparatus 10 in the first, uncompressed position may be easily withdrawn from the component 110 without damaging the component.

It will be understood by those of ordinary skill in the art from the complete disclosure herewith that the present inserts in some embodiments are usable in the context of a two-part mold incorporating present subject matter. For example, in general, holes in such a mold may be sized for a plurality of inner rods. Such inner rods may be attached to the surface of a bottom mold component. The surface of a corresponding or matching mold component may have a respective plurality of holes for the respective plurality of inner rods. In such a configured embodiment, the top mold may then be installed on the bottom mold, thereby compressing the respective plurality of outer jackets of the array of passage or hole formers. As otherwise discussed herein, the compressed outer jackets axially expand, thereby sealing the holes in the mold. Subsequent removal of the top mold component may reverse such process, as well understood by those of ordinary skill in the art from the complete disclosure herewith.

This written description uses examples to disclose the present subject matter, including the best mode, and also to enable any person skilled in the art to practice the present subject matter, including making and using any devices or systems and performing any incorporated methods While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A mold comprising:
two opposing mold walls, each having a hole therein having an inner diameter; and
an expandable molding insert apparatus for forming conduits within molded components, including
an inner rod;
an outer jacket; and
a compression member, configured to selectively provide axial compression to the outer jacket, to adjust said outer jacket between a first uncompressed position with a first outer diameter and a second compressed position with a second, larger outer diameter, the second, larger outer diameter being equal to the inner diameter such that a portion of the outer jacket is within the hole of each of the two opposing mold walls.

2. The mold according to claim 1, wherein said axial compression to said outer jacket comprises an axial compressive force applied to said outer jacket by said compression member, so as to cause the length of said outer jacket to be reduced for causing the outer diameter of said outer jacket to radially expand from said first outer diameter to said second, larger outer diameter.

3. The mold according to claim 2, wherein:
said inner rod is threaded; and
said compression member comprises a nut threadably rotatable on said inner rod such that said nut travels axially along the length of said inner rod in a first direction so as to apply said axial compressive force to said outer jacket.

4. The mold according to claim 3, wherein said compression member further includes a washer received on said inner rod between said nut and said outer jacket, so that travel of said nut in said first direction causes said washer to apply said axial compressive force to said outer jacket.

5. The mold according to claim 1, wherein said compression member is mounted on said inner rod and disposed adjacent an end of said outer jacket, said compression member having a diameter that is substantially at least equal to the diameter of said outer jacket in said first uncompressed position thereof, so as to axially compress said outer jacket substantially evenly throughout the diameter thereof.

6. The mold according to claim 5, wherein said compression member further forms a seal for said end of said outer jacket, so that formation materials to be poured into an associated mold do not enter said insert apparatus.

7. The mold according to claim 1, wherein said compression member comprises cylinder means that may be actuated to provide axial compression to said outer jacket.

8. The mold according to claim 7, wherein said cylinder means comprises one of a pneumatic or hydraulic cylinder, and comprises an associated rod or piston component for actuation of same.

9. The mold according to claim 1, wherein:
said compression member is mounted on said inner rod and disposed adjacent one end of said outer jacket; and
said insert apparatus further includes a base member mounted on said inner rod disposed adjacent an end of said outer jacket opposite said one end thereof.

10. The mold according to claim 9, wherein said base member is configured to facilitate the axial compression of said outer jacket, and has a diameter that is substantially at least equal to the diameter of said outer jacket in said first uncompressed position thereof so as to axially compress said outer jacket substantially evenly throughout the diameter thereof.

11. The mold according to claim 9, wherein said base member comprises a stationary base member.

12. The mold according to claim 11, wherein said stationary base member comprises a head of said inner rod.

13. The mold according to claim 12, wherein said base member further includes a washer disposed adjacent said head.

14. The mold according to claim 9, wherein:
said inner rod is threaded; and
said base member comprises a nut threadably rotatable on said inner rod such that said nut travels axially along the length of said inner rod in a direction so as to apply said axial compressive force to said outer jacket.

15. The mold according to claim 9, wherein:
said inner rod is threaded; and
said base member includes a washer, and further includes a locking nut threaded on said inner rod.

16. The mold according to claim 1, wherein said inner rod has a predetermined cross-section, and has threads extending generally along at least a portion of the length thereof.

17. The mold according to claim 16, wherein said predetermined cross-section comprises a polygonal cross-section, and said threads extend generally along the entire length of said inner rod.

18. The mold according to claim 16, wherein said inner rod has a substantially constant diameter throughout the entire length thereof.

19. The mold according to claim 1, wherein said outer jacket comprises a single integral component.

20. The mold according to claim 1, wherein said outer jacket comprises a plurality of respective jacket components received along the length of said inner rod.

21. The mold according to claim 1, wherein said outer jacket has a predetermined cross-section, and forms a bore for receipt of said inner rod therein.

22. The mold according to claim 1, wherein said outer jacket comprises deformable material that may be axially compressed.

23. The mold according to claim 22, wherein said outer jacket comprises polymer material.

24. The mold according to claim 1, wherein said outer jacket comprises at least one of rubber and polymer materials, and has a predetermined durometer rating in a range of from approximately 40 A to approximately 90 A.

25. A mold, comprising:
two opposing mold walls, each having a hole therein having an inner diameter; and
an expandable molding insert apparatus for forming conduits within molded components, including
an inner shaft, having a length, with respective opposite ends and with external threading over at least a portion of such length thereof;
an outer jacket having a central bore for receipt of said inner shaft, said outer jacket formed of compressible material having a predetermined hardness; and
compression means, for selectively providing axial compression, and release of such compression, to said outer jacket, and for moving said outer jacket between a first axially uncompressed position thereof having a first outer diameter, and a second axially compressed position thereof having a second, larger outer diameter, the second, larger outer diameter being equal to the inner diameter such that a portion of the outer jacket is within the hole of each of the two opposing mold walls.

26. The mold according to claim 25, wherein said compression means includes at least one nut threadably rotatable on said inner shaft such that said nut travels axially along the length of said inner shaft in a first direction so as to apply axial compressive force to said outer jacket.

27. The mold according to claim 26, wherein:
said compression means further includes a washer received on said inner shaft between said nut and said outer jacket, so that travel of said nut in said first direction causes said washer to apply said axial compressive force to said outer jacket; and
said washer has a diameter that is substantially at least equal to the diameter of said outer jacket in said first uncompressed position thereof, so as to axially compress said outer jacket substantially evenly throughout the diameter thereof.

28. The mold according to claim 26, wherein said nut and washer are received adjacent one end of said inner shaft, and said compression means further includes a base member received adjacent the opposite end of said inner shaft and configured for further selectively providing axial compression, and release of such compression, to said outer jacket.

29. The mold according to claim 26, wherein said nut and washer are received adjacent one end of said inner shaft, and said compression means further includes a second nut and washer received adjacent the opposite end of said inner shaft and configured for further selectively providing axial compression, and release of such compression, to said outer jacket.

30. The mold according to claim 25, wherein said compression means includes one of a pneumatic or hydraulic cylinder that may be actuated to provide axial compression to said outer jacket.

31. The mold according to claim 25, wherein said inner shaft and said central bore have respective, mating predetermined polygonal cross-sections.

32. The mold according to claim 25, wherein:
said inner rod is formed of one of metal, metal-alloy, plastics, polymers, and ceramics; and
said outer jacket comprises deformable material that may be axially compressed.

33. The mold according to claim 1, wherein said inner rod is formed of one of metal, metal-alloy, plastics, polymers, and ceramics.

34. The mold according to claim 22, wherein said insert apparatus further includes a plurality of inner rods, and said outer jacket further forms a corresponding plurality of bores for respective receipt of said inner rods.

\* \* \* \* \*